US008731609B2

(12) United States Patent
Roth et al.

(10) Patent No.: US 8,731,609 B2
(45) Date of Patent: May 20, 2014

(54) EXTENDABLE VOICE COMMANDS

(75) Inventors: Daniel L. Roth, Boston, MA (US); Chris Reiner, Cambridge, MA (US); Mark Furnari, Indian Harbor Beach, FL (US); Jordan Cohen, Gloucester, MA (US)

(73) Assignee: Nuanace Communications, Inc., Burlington, MA (US)

( * ) Notice: Subject to any disclaimer, the term of this patent is extended or adjusted under 35 U.S.C. 154(b) by 100 days.

(21) Appl. No.: 13/206,008

(22) Filed: Aug. 9, 2011

(65) Prior Publication Data

US 2011/0294476 A1 Dec. 1, 2011

Related U.S. Application Data

(63) Continuation of application No. 11/158,994, filed on Jun. 22, 2005, now Pat. No. 8,019,324.

(60) Provisional application No. 60/581,959, filed on Jun. 22, 2004.

(51) Int. Cl.
*H04M 1/00* (2006.01)

(52) U.S. Cl.
USPC .................. 455/553.1; 455/550.1; 455/552.1; 455/79; 455/563; 715/810; 704/E15.001; 381/110

(58) Field of Classification Search
USPC ................ 455/414.1–414.4, 418–420, 456.3, 455/127.4, 569.1–570, 563, 79, 455/550.1–553.1, 556.2; 370/259–271; 715/810–845, 728; 704/231–257, 704/270–278, E15.001; 381/110–117
See application file for complete search history.

(56) References Cited

U.S. PATENT DOCUMENTS

| | | | | |
|---|---|---|---|---|
| 6,144,726 | A * | 11/2000 | Cross | 379/114.03 |
| 6,456,975 | B1 * | 9/2002 | Chang | 704/270.1 |
| 6,791,529 | B2 * | 9/2004 | Shteyn | 345/156 |
| 7,123,933 | B2 * | 10/2006 | Poor et al. | 455/552.1 |
| 2001/0044275 | A1 * | 11/2001 | Yamaguchi | 455/11.1 |
| 2002/0077833 | A1 * | 6/2002 | Arons et al. | 704/277 |
| 2003/0013483 | A1 * | 1/2003 | Ausems et al. | 455/556 |
| 2003/0045279 | A1 * | 3/2003 | Shostak | 455/422 |
| 2004/0122941 | A1 * | 6/2004 | Creamer et al. | 709/224 |
| 2004/0162724 | A1 * | 8/2004 | Hill et al. | 704/231 |
| 2004/0176958 | A1 * | 9/2004 | Salmenkaita et al. | 704/275 |
| 2005/0071171 | A1 * | 3/2005 | Dvorak | 704/275 |
| 2005/0277432 | A1 * | 12/2005 | Viana et al. | 455/466 |
| 2006/0111095 | A1 * | 5/2006 | Weigand | 455/418 |

* cited by examiner

*Primary Examiner* — Ronald Eisner
(74) *Attorney, Agent, or Firm* — Chapin IP Law, LLC

(57) ABSTRACT

A mobile device, such as a cellular telephone includes a voice interface that includes one part that may not be specific to a particular carrier, and a second part that provides an interface to services that are specific to a carrier or to service or information providers that are not necessarily available with all carriers. A voice command interface provides easy access to the carrier services. The set of carrier services is optionally extendible by the carrier.

23 Claims, 2 Drawing Sheets

GENERIC INTERFACE
CARRIER INTERFACE
ROOT STATE
210
CALENDAR STATE
PRESS SPEECH SERVICES BUTTON
250
SPEECH SERVICES STATE
"STOCK PRICE"
255
"WHICH STOCK"
"IBM"
DELIVER PRICE
260

EXTENDABLE VOICE COMMANDS

CROSS-REFERENCE TO RELATED APPLICATIONS

This Patent Application claims the benefit of U.S. Provisional Application No. 60/581,959, entitled “Carrier Specific Launch Commands,” filed on Jun. 22, 2004, which is incorporated herein by reference.

This U.S. Patent Application is a Continuation of U.S. patent application Ser. No. 11/158,994 filed on Jun. 22, 2005 now U.S. Pat. No. 8,019,324, entitled, “Extendable Voice Commands”, the contents and teachings of which are hereby incorporated by reference in their entirety.

BACKGROUND

This invention relates to extendable voice commands that can be processed in a device. Portable devices, such as cellular telephones, today provide access to a wide variety of services or information, such as services provided or sold by telecommunication carriers or other parties, such as content providers or advertisers. To access the information or services, a user must typically navigate through a series of interface presentations (e.g. screens), for example using keypad inputs.

Recent progress in speech recognition makes possible interfaces in which manual input is replaced by speaking, for example, by uttering a name of a field shown on a screen. Users expect more and more services to be available, making accessing those services complex and time consuming, even using speech recognition.

SUMMARY

In one aspect, in general, a method of providing carrier services at a mobile device makes use of data stored in the mobile device that specifies a voice interface for the mobile device. This data includes first data specifying a set of interface states associated with a first set of functions and a second data that specifies an interface for accessing the carrier services. A command associated with a request to access the carrier services is received, and then one or more inputs form the user are processed according to the second data. Actions are processed based on the one or more inputs and the second data to provide one of the carrier services at the mobile device.

Aspects can include one or more of the following features.

The first set of functions operates independently of a carrier providing services to the mobile device.

Receiving the command associated with a request to access the carrier services includes accepting a manual input using a button associated with the carrier services.

The second data includes a script for providing one of the carrier services.

The second data is received independently of receiving the first data. Receiving the second data can include downloading the second data from a carrier, for example, over a wireless network.

The second data includes specifications of interactions with remote systems from the mobile device.

The mobile device comprises a mobile telephone.

Inputs from the user are processed using the first data, resulting in the interface being in a first interface state when the command associated with a request to access the carrier services is received. The first interface state can then be restored after completing processing of the one or more inputs from the user according to the second data, or a predetermined interface state can be selected after completing processing of the one or more inputs from the user according to the second data.

Aspects of the invention may include one or more of the following advantages:

The user can access a service with a single step voice command. The user avoids lengthy Internet browsing, involving use of a dedicated device, such as a mouse, keyboard or keypad, to search for and execute services that might not even correspond entirely to the user need.

The providers make the users aware, in a simple and expeditious way, of services that otherwise the users might not discover.

The user accesses services by speaking commands in the most natural way of human communication.

The user may use the carrier services more often than with a more complex user interface thereby potentially increasing revenue from the services or increasing satisfaction of the user with the carrier.

The user can maintain a personal set of services customized to his/her needs, services available everywhere, in the fastest way possible. Customization may include delivering services dependent of the user current location.

Other features and advantages of the invention are apparent from the following description, and from the claims.

DESCRIPTION

Figure 1:
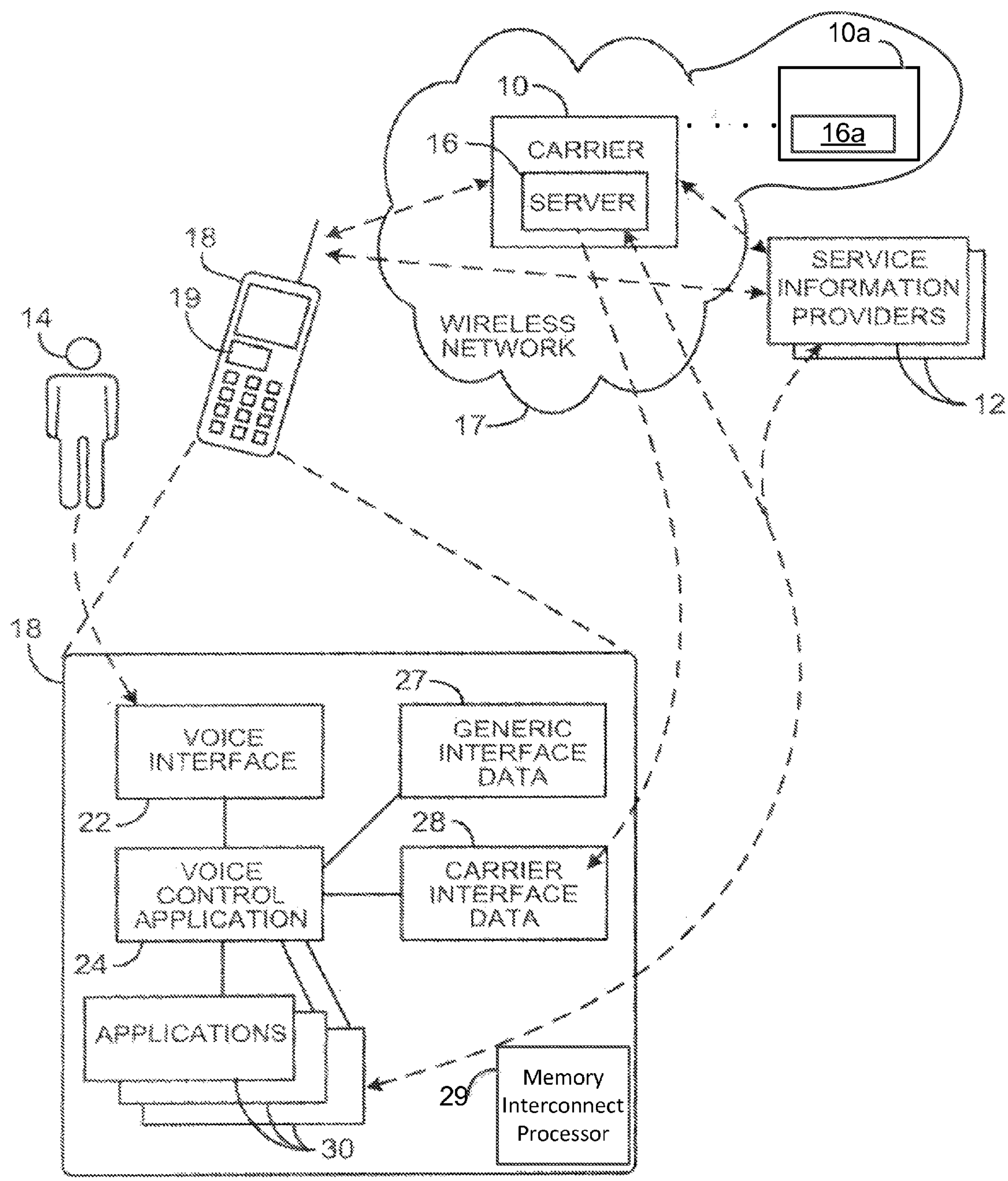
FIG. 1 is a block diagram of a communication system.

Referring to FIG. 1, a user 14 can command a mobile device 18 (e.g., a telephone or a personal digital assistant) to access a wide range of services provided by a carrier 10 or a service or information provider 12 over a wireless network 17, such as over a cellular telephone network. The mobile device 18 includes a voice interface 22, which allows the user 14 to speak commands that control operation of the device 18 or applications 30 hosted on or otherwise accessible via the device 18. The voice interface 22 makes use of a speech recognition engine that identifies the commands spoken by the user. Some of the applications can access information or services provided remotely to the device 18 by the carrier 10. It should be understood that in the description below, information or services could alternatively or additionally be provided by service or information providers 12 that may be separate from the carrier or not necessarily affiliated with the carrier.

As examples, the applications 30 can provide the user 14 with a broad range of services, from the simplest text weather update, to complex services, such as taking a picture and posting it on a web site. A voice control application 24 hosted in the mobile device 18 controls the voice interface 22 according to data that defines a set of interface states.

Interface states can be associated with intermediate points in a multiple-turn interaction in which the device provides information to the user (for example on the display and/or with audio output) and then the user provides an input (for example by voice or by manual action). The state in general includes information defining the point in the interaction as well as specific information that is displaced or otherwise presented to the user. For example, at each state the device can indicate a limited set of commands, and the user provides one of the commands that can cause actions or changes in state in the interface. Typically, the states of the interface are arranged in a menu tree structure.

Such a menu tree structure typically include a root state in which a general set of commands are available to a user. Each different command that can be entered by the user is associated with a transition to a next level state. For example, to set ring volume, a user may choose a "settings" command at the root state, a "phone" command at the next state, a "ring volume" command at a next state, and select a volume level at the final state in the interaction. Due in part to the limited nature of the manual inputs on the device, as in the ring volume example, accessing any particular function or service may require multiple interactions.

The mobile device 18 includes data that specifies commands that the user can use at various states of the interface and corresponding actions to be carried out when the user 14 utters or otherwise enters a command. The data that specifies the interface includes generic interface data 27 as well as carrier interface data 28. In general, the generic interface data 27 specifies a menu tree related to functions or services that are related to the capabilities of the telephone or that may not be specific to any particular carrier. The carrier interface data 28 relates to services or information that are generally specific to the carrier, or to service or information providers that are not necessarily available with all carriers.

An action can be complex, for example involving use of one or more applications, and/or one or more interactions with the carrier or remote service or information providers. Some of the commands specified in the interface data 27 and 28 can be "shortcuts" that directly access a remote service or information using a single voice command, instead of what may otherwise involve several interactions.

A carrier 10 that provides service to the mobile device 18 may offer a set of services that are particular to that carrier. For example, such services can include help services, access to portals for information or downloading applications, music services, gaming services, location based services (e.g., information bearing or marketing based), and call management services (e.g., to set up multiparty calls, enable roaming, or other management services). The carrier provides carrier interface data 28 to the mobile device 18 in order to specify an interface to these carrier services. This data can be provided by the carrier in a number of alternative ways. For example, the carrier interface 28 can be embedded in a non-volatile storage in the mobile device 18 by the device manufacturer at the request of the carrier. Alternatively, the data can be downloaded to the device as part of provisioning the user's mobile service, or can be downloaded from the carrier (e.g., pushed by or pulled from the carrier using OTA or web based protocols) during the service period of the device, for example, when the user subscribes to a new service.

An illustrative technical feature of the mobile device is that the generic interface data 27 and the carrier interface data 28 can be maintained independently, for example, being loaded into the mobile device at different times or using different, independent procedures. This supports different carriers offering different sets of services, or the same carrier offering different services to different subscribers or offering different services over time, without having to change the generic interface data 27 or change the menu structure that a user may have become accustomed to.

The carrier interface data 28 specifies the characteristics of the user interface that allow the user to access the carrier's services. One example of such an interface makes use of a specific button 19 that gives the user access to "speech services" on the device, and which are selectively enabled at each state of the interface depending on choices made by the carrier (or by the carrier's proxy, the device manufacturer). In such an example, when the user presses the speech services button 19, the speech recognition engine is configured to receive voice commands (for example by initializing or creating a software instance of speech recognition software) and the device displays information related to the speech services, such as a menu indicating the available services. Note that if the button is enabled all the time, these speech services will be available to the user independent of the state of the device. For example, using speech services a user may instantaneously go from the screen of an SMS application to a gaming site, and after downloading a game he may resume his SMS application where he had left it.

The carrier's speech services which are implemented from some state in the menu structure may, at the carrier's choice, return the device to a top menu, or it may record the state of the device and return the user to the point from which the voice services were initiated. Note that the state of a device in general includes a combination of where the display is pointing in the menu, what is on the screen, and possibly the status of one or several of the networks (e.g., receiving an SMS, in the midst of a phone call, listening to a music clip).

In this example of the interface, when the user pushes the speech services button 19, a menu appears in which the carrier's or third party's prompts are listed (for example, ring tones; stock quotes; operator assistance). Alternatively, the device may be directed to a "standard" speech services screen, taking over the real estate of the display in whole or in part. The state of the phone may be cached for a return after the voice service is finished. Whatever the status of the phone, it is interrupted and the speech service application is started, displaying strings to the user. The user may say any of the listed strings, and the phone will take the appropriate action, as specified by the carrier's linkage between a phrase and an action. For example, if the user says "ring tones" the phone will launch a browser and point it to the ring tone download site that the carrier has specified. Note that the carrier can enable functions which are available through the speech services menu, but which are not listed explicitly (as long as the appropriate strings are in the speech recognizer's vocabulary list, they will be recognized). Among the strings which might be quietly made available might be "911", "operator assistance", "billing help", or others.

The carrier may choose to have some speech services available only at selected telephone states (for instance, "operator assistance" might not be available if a phone call is in progress), and it is possible to choose which actions can be taken at every state in the cell phone's activity. Note also that speech services may be initiated by the speech services button 19, or alternatively using a "soft key" in a PDA device, or using a trigger voice command on an always-listening device. Carriers may have the selectable services installed when the phone is sold, or may update the appropriate parts of the user interface and other components as necessary by downloading information over the air, or by synching with a separate computer.

Figure 2:
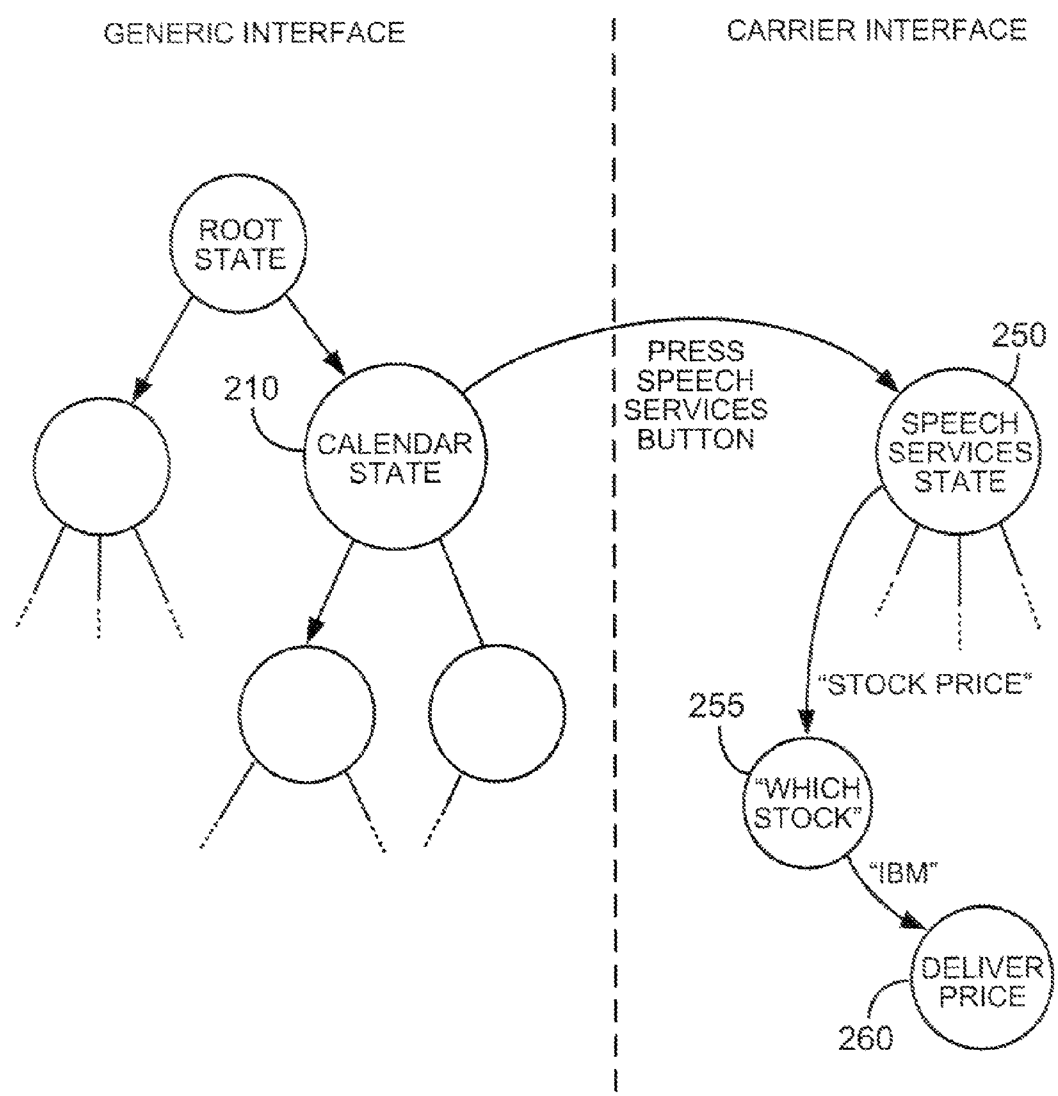
FIG. 2 is an interface state diagram.

Referring to FIG. 2, as another example of a service that may be provided by a carrier using this approach, a user is accessing his calendar on his cell phone with the generic interface being in a calendar state 210, but would like to know the price of IBM's stock. The carrier has installed a speech service called "stock price" in the voice menu associated with the selected speech services button, and the user or the carrier has identified a finite set of stocks which the user may query. The user is looking at a screen representing his current calendar. He presses the speech services button 19 resulting in the interface entering a speech services state 250. The screen is temporarily overwritten by a list of commands that he can say, one of which is "stock price". The user says "stock price", resulting in a state transition to a state 255 in which the phone responds (either aurally, on the display, or both) "which stock", the screen shows a list of the stock prices which will be available. "IBM" is one of the choices on that list, and the user says "IBM". The phone recognizes IBM, makes a transition to state 260 and sends a message back to the carrier to deliver the IBM stock price to the user. (This delivery to the carrier may be over an SMS channel, over an IP connection, over WIFI if it is available, or over any other network which is available to the user and/or the carrier).

Upon receipt of the IBM quote request, the carrier looks up the current IBM stock price, and sends an SMS message to the user with the current IBM price. Alternatively, the carrier can send the user a URL for use with the WAP browser built into the phone or with the HTML browser available on some phones, or may initiate a phone call to the user which speaks the price, or may leave an audio message for the user in his voice mail inbox, or they may even send an email or MMS message, or yet other delivery services may be used. After completion of the stock price interaction, the interface returns to the calendar state 210 in which the speech services button 19 was originally pressed.

In another example, the user is on a telephone call with another user, and they would both be interested in the stock price. The user pushes the voice services button, and asks for a verbal quote for IBM stock. The carrier delivers a voice message with the stock price, and that message may be played to both listeners simultaneously.

In yet another example, the user might want to listen to the current news from CNN. Assume that the user is looking at an entry in his PIM, but that the voice launch button is enabled for that state, and further that the carrier has included CNN as a listing in the available commands. The user pushes the voice services button. The screen then displays a list of commands, of which "CNN" is one. The user says "CNN", and the phone then sends a request to the carrier to initiate a multimedia session delivering CNN to the user over his phone. The phone state is then interrupted by a multimodal "broadcast" of CNN, and the user listens until it ends or until he terminates the reception.

In operation of the voice-based user interface, the voice interface 22 captures digital voice signals containing utterances from the user 14 and identifies commands in the utterances and may also deliver digital voice signals in audible form (i.e., synthesized or recorded voice) to the user 14. The digital voice signal received from the user is processed by the speech recognition engine in order to recognize the voice command. A text to speech module generates digital voice signal from text that is to be presented to the user 14.

The interface data 27 and 28 contains specification of commands that the user can speak and associations between the commands and the actions to be carried out when the user speaks a command. The specification of an action can be in the form of a text string that includes one or more instructions, or a script, that may be processed to carry out the action. For example, such an instruction can identify a particular application 30 to execute and inputs to provide to the application. An action associated with a command can specify that the application is to communicate with carrier server 16 over a wireless telecommunication network 17. For example, the mobile device 18 may communicate with the carrier servers 16 . . . 16*a* and can receive carrier interface data 28 from at least two carriers through Media Messaging Services (MMS), specially designed to deliver multimedia services to mobile devices, or Wireless Application Protocol (WAP). The mobile device 18 includes a computer system comprising a processor; a memory unit that stores instructions associated with an application executed by the processor; and an interconnect coupling the processor and the memory unit. The carrier servers 16 may use the MMS Push procedure to deliver multimedia messages to the mobile device 18. The communication between the mobile device 18 and the carrier servers 16 is not limited to specific procedures and protocols identified above.

A process runs in the mobile device 18, coordinated by the voice application 24, which updates the speech related information in the carrier interface data 28. In this process, the carrier updates the vocabulary in the carrier interface data 28. The vocabulary defines the list of utterances of words that are recognized by the mobile device 18. As the vocabulary is updated, the user 14 is made aware of the new valid words he/she can use to communicate with the device 18, for example the new valid utterances are presented to the user as text and speech via the text to speech module 26 or on the screen. The carrier may update the grammar in the carrier interface data 28. The voice user interface 22 uses the grammar and the vocabulary to understand the user voice commands.

The carrier may also update the set of applications 30, either replacing old applications or add new applications. The applications 30 reflect the range of services available to the user. A new application corresponds to a new service made available to the user.

The user 14 may participate in maintaining the carrier interface data 28, with support from the voice application 24. For example, the user may inspect the set of voice commands he/she can use, and determine for each voice command what service is provided. The user 14 may decide to delete commands and applications that provide uninteresting services.

Although the user 14 may receive updates for new services from the carrier on a regular basis, there may be instances when the user wants a service he/she does not have. The user 14 may be aware of the identity of the carrier and location of its servers 16, and may examine the servers' content in search for a service. Also, the user may be aware of the location of a certain service from either past experience with the service, or recent advertising. Regardless of how the user identifies a desired service, he/she may use a dedicated player application to download the necessary support for the desired new service.

In addition or as an alternative to the carrier, a range of other parties may provide services in mobile devices. Carriers may provide their customers with mobile devices that support an initial set of services that can be launched by single step voice commands. Carriers may expand the list of available services or allow other parties such as advertisers and vendors to reach their customers with new services under a variety of business scenarios.

In one embodiment, the approach described above is implemented in software, or in a combination of software and hardware. Software in the mobile device, which in general includes instructions for a physical or a virtual processor, can be in a machine-readable medium, such as in non-volatile semiconductor memory. The software can be delivered to the mobile device embodied on a propagated signal, such as embodied in data signals passing over the wireless network.

It is to be understood that the foregoing description is intended to illustrate and not to limit the scope of the invention, which is defined by the scope of the appended claims. Other embodiments are within the scope of the following claims.

What is claimed is:

1. A method of implementing at least one functionality with respect to carrier services at a mobile device, the method comprising:

providing independently maintained generic interface data to the mobile device from which a speech services state is selected, the generic interface data supporting a menu tree related to services related to the capabilities of the mobile device independent from any particular carrier data and separately loadable into the mobile device;

receiving first carrier interface data including characteristics of the first carrier speech service at a carrier interface on the mobile device, the first carrier interface data providing data with respect to accessing a first carrier service of a first carrier service provider;

receiving second carrier interface data at the carrier interface on the mobile device, the second carrier interface data providing data with respect to accessing a second carrier service of a second carrier service provider, the first carrier service provider different than the second carrier service provider;

associating at least one respective mobile device interface state defined in a menu tree structure interface with each of the first carrier interface data and the second carrier interface data;

providing speech services on the mobile device comprising speech recognition; and receiving updated grammar and vocabulary in the first carrier interface data to understand voice commands related to services offered by the first carrier, the updates provided by the first carrier.

2. The method as in claim 1, wherein receiving first carrier interface data at the carrier interface includes:

receiving a definition of a relationship between the first carrier service and a first mobile device interface state of a multiple-turn interaction, the relationship selectively enabled by the first carrier service provider.

3. The method as in claim 2, includes:

upon associating the at least one mobile device state in the menu tree structure interface with the first carrier interface data, implementing the relationship between the first carrier service and the first mobile device interface state.

4. The method as in claim 3, wherein implementing the relationship between the first carrier service and the first mobile device interface state includes:

prohibiting mobile device access to the first carrier service when the mobile device is set at the first mobile device interface state.

5. The method as in claim 3, wherein implementing the relationship between the first carrier service and the first mobile device interface state via the carrier interface and the menu tree structure interface includes:

setting the mobile device at the first mobile device interface state upon termination of a mobile device session of the first carrier service.

6. The method as in claim 3, wherein implementing the relationship between the first carrier service and the first mobile device interface state via the carrier interface and the menu tree structure interface includes:

updating a visual indicator associated with the first carrier service, wherein the menu tree structure interface displays the updated visual indicator when the mobile device is set at the first mobile device interface state.

7. The method as in claim 6, comprising:

updating the visual indicator after receiving the second carrier interface data at the carrier interface.

8. The method as in claim 3, wherein implementing the relationship between the first carrier service and the first mobile device interface state via the carrier interface and the menu tree structure interface includes:

initiating access to the first carrier service by the mobile device based on receipt of at least one aural cue, wherein the at least one aural cue is (i) defined in the first interface data and (ii) graphically represented in the menu tree structure interface when the mobile device is at the first mobile device interface state.

9. The method as in claim 8, initiating access to the first carrier service by the mobile device based on receipt of the at least one aural cue includes:

detecting a selection of the first mobile device interface state, the first mobile device interface state comprising a speech services state;

displaying a graphical representation of a first aural cue;

providing the first aural cue;

transitioning from the first mobile device interface state to a second mobile device interface state based on receipt of a voice command in response to the first aural cue;

executing the voice command;

displaying a graphical representation of a second aural cue; and upon receiving the second aural cue, accessing the first carrier service.

10. A non-transitory computer readable storage medium comprising executable instructions encoded thereon operable on a computerized device to perform processing comprising at least one instruction for:

providing independently maintained generic interface data to the mobile device from which a speech services state is selected the generic interface data supporting a menu tree related to services related to the capabilities of the mobile device independent from any particular carrier data and separately loadable into the mobile device;

receiving first carrier interface data including characteristics of the first carrier speech services at a carrier interface on the computerized device, the first carrier interface data providing data with respect to accessing a first carrier service of a first carrier service provider;

receiving second carrier interface data at the carrier interface on the mobile device, the second carrier interface data providing data with respect to accessing a second carrier service of a second carrier service provider, the first carrier service provider different than the second carrier service provider; and associating at least one respective mobile device interface state defined in a menu tree structure interface with each of the first carrier interface data and the second carrier interface data; and providing speech services on the mobile device comprising speech recognition; and receiving updated grammar and vocabulary in the first carrier interface data to understand voice commands related to services offered by the first carrier, the updates provided by the first carrier.

11. The non-transitory computer readable storage medium as in claim 10, wherein the at least one instruction for receiving first carrier interface data at the carrier interface includes at least one instruction for:

receiving a definition of a relationship between the first carrier service and a first mobile device interface state of a multiple-turn interaction, the relationship selectively enabled by the first carrier service provider.

12. The non-transitory computer readable storage medium as in claim 11, includes:

at least one instruction for implementing the relationship between the first carrier service and the first mobile device interface state upon associating the at least one mobile device interface state in the menu tree structure interface with the first carrier interface data.

13. The non-transitory computer readable storage medium as in claim 12, wherein the at least one instruction for implementing the relationship between the first carrier service and the first mobile device interface state includes at least one instruction for:

prohibiting mobile device access to the first carrier service when the mobile device is set at the first mobile device interface state.

14. The non-transitory computer readable storage medium as in claim 12, wherein the at least one instruction for implementing the relationship between the first carrier service and the first mobile device interface state via the carrier interface and the menu tree structure interface includes at least one instruction for:

setting the mobile device at the first mobile device interface state upon termination of a mobile device session of the first carrier service.

15. The non-transitory computer readable storage medium as in claim 12, wherein the at least one instruction for implementing the relationship between the first carrier service and the first mobile device interface state via the carrier interface and the menu tree structure interface includes at least one instruction for:

updating a visual indicator associated with the first carrier service, wherein the menu tree structure interface displays the updated visual indicator when the mobile device is set at the first mobile device interface state.

16. The non-transitory computer readable storage medium as in claim 15, comprising:

at least one instruction for updating the visual indicator after receiving the second carrier interface data at the carrier interface.

17. The non-transitory computer readable storage medium as in claim 12, wherein the at least one instruction for implementing the relationship between the first carrier service and the first mobile device interface state via the carrier interface and the menu tree structure interface includes at least one instruction for:

initiating access to the first carrier service by the mobile device based on receipt of at least one aural cue, wherein the at least one aural cue is (i) defined in the first interface data and (ii) graphically represented in the menu tree structure interface when the mobile device is at the first mobile device interface state.

18. The non-transitory computer readable storage medium as in claim 17, wherein the at least one instruction for initiating access to the first carrier service by the mobile device based on receipt of the at least one aural cue includes at least one instruction for:

detecting a selection of the first mobile device interface state, the first mobile device interface state comprising a speech services state;

displaying a graphical representation of a first aural cue;

providing the first aural cue;

transitioning from the first mobile device interface state to a second mobile device interface state based on receipt of a voice command in response to the first aural cue;

executing the voice command;

displaying a graphical representation of a second aural cue; and upon receiving the second aural cue, accessing the first carrier service.

19. A computer system comprising:

a processor;

a memory unit that stores instructions associated with an application executed by the processor; and an interconnect coupling the processor and the memory unit, enabling the computer system to execute the application and perform operations of:

providing independently maintained generic interface data to the mobile device from which a speech services state is selected, the generic interface data supporting a menu tree related to services related to the capabilities of the mobile device independent from any particular carrier data and separately loadable into the mobile device;

receiving first carrier interface data including characteristics of the first carrier speech services at a carrier interface on the computer system, the first carrier interface data providing data with respect to accessing a first carrier service of a first carrier service provider;

receiving second carrier interface data on the mobile device at the carrier interface, the second carrier interface data providing data with respect to accessing a second carrier service of a second carrier service provider, the first carrier service provider different than the second carrier service provider;

associating at least one respective mobile device interface state defined in a menu tree structure interface with each of the first carrier interface data and the second carrier interface data;

providing speech services on the mobile device comprising speech recognition; and receiving updated grammar and vocabulary in the first carrier interface data to understand voice commands related to services offered by the first carrier, the updates provided by the first carrier.

20. The computer system as in claim 19, wherein receiving first carrier interface data at the carrier interface includes: receiving a definition of a relationship between the first carrier service and a first mobile device interface state of a multiple-turn interaction, the relationship selectively enabled by the first carrier service provider;

upon associating the at least one mobile device interface state in the menu tree structure interface with the first carrier interface data, implementing the relationship between the first carrier service and the first mobile device interface state;

wherein implementing the relationship between the first carrier service and the first mobile device interface state via the carrier interface and the menu tree structure interface includes: initiating access to the first carrier service by the mobile device based on receipt of at least one aural cue, wherein the at least one aural cue is (i) defined in the first interface data and (ii) graphically represented in the menu tree structure interface when the mobile device is at the first mobile device interface state; and wherein initiating access to the first carrier service by the mobile device based on receipt of the at least one aural cue includes:

detecting a selection of the first mobile device interface state, the first mobile device interface state comprising a speech services state;

displaying a graphical representation of a first aural cue;

providing the first aural cue;

transitioning from the first mobile device interface state to a second mobile device interface state based on receipt of a voice command in response to the first aural cue;

executing the voice command;

displaying a graphical representation of a second aural cue; and upon receiving the second aural cue, accessing the first carrier service.

21. The method as in claim 1, further comprising:

updating the vocabulary which defines the list of utterances words that are recognized by the mobile device; and presenting the utterances to a user as speech via a text to speech module on the mobile device.

22. The method as in claim 1, further comprising providing carrier services and executing corresponding applications on the mobile device via a specified set of interface states based on the voice commands.

23. The method as in claim 1, further comprising providing a user interface to allow the user to participate in maintaining the carrier interface data including allowing the user to inspect a set of voice commands and to delete selected commands.

* * * * *